United States Patent
Zeas

(10) Patent No.: US 9,239,043 B1
(45) Date of Patent: Jan. 19, 2016

(54) CONVERSION OF KINETIC INTO ELECTRIC ENERGY UTILIZING THE UNIVERSAL PRINCIPLES OF GRAVITY AND MAGNETISM

(76) Inventor: Jaime ("James") Teodoro Zeas, Bethesda, MD (US)

( * ) Notice: Subject to any disclaimer, the term of this patent is extended or adjusted under 35 U.S.C. 154(b) by 405 days.

(21) Appl. No.: 12/706,417

(22) Filed: Feb. 16, 2010

Related U.S. Application Data

(60) Provisional application No. 61/153,024, filed on Feb. 17, 2009.

(51) Int. Cl.
  F02B 63/04 (2006.01)
  F03G 7/08 (2006.01)
  G08G 1/042 (2006.01)
  H02K 7/18 (2006.01)

(52) U.S. Cl.
  CPC *F03G 7/08* (2013.01); *G08G 1/042* (2013.01); *H02K 7/1853* (2013.01)

(58) Field of Classification Search
  CPC ......... F03G 7/08; G08G 1/042; H02K 7/1853
  USPC .................................. 290/1 R; 340/931, 933
  See application file for complete search history.

(56) References Cited

U.S. PATENT DOCUMENTS

| | | | | |
|---|---|---|---|---|
| 3,778,761 A * | 12/1973 | Cribbins | | 340/935 |
| 3,859,589 A * | 1/1975 | Rush | | 322/40 |
| 3,885,163 A * | 5/1975 | Toberman | | 290/1 R |
| 4,247,785 A * | 1/1981 | Apgar | | 290/1 R |
| 4,437,015 A * | 3/1984 | Rosenblum | | 290/1 R |
| 4,614,875 A * | 9/1986 | McGee | | 290/1 R |
| 7,239,031 B2 | 7/2007 | Ricketts | | |
| 7,432,607 B2 * | 10/2008 | Kim et al. | | 290/1 R |
| 7,489,045 B1 | 2/2009 | Bradford et al. | | |
| 7,530,761 B2 | 5/2009 | Kenney | | |
| 7,541,684 B1 | 6/2009 | Valentino | | |
| 7,589,427 B2 * | 9/2009 | Davis | | 290/1 R |
| 7,589,428 B2 | 9/2009 | Ghassemi | | |
| 2009/0173589 A1 * | 7/2009 | Nejmeh | | 191/2 |
| 2010/0327602 A1 * | 12/2010 | Jordan | | 290/1 R |

* cited by examiner

Primary Examiner — Michael Zarroli

(57) ABSTRACT

The present invention is directed to a method of generating electricity from the unharnessed existing kinetic movement of various self-propelled sources: vehicles, wheeled vehicles, pedestrians, objects and/or wheeled objects with the aid of natural phenomena (i.e., gravity, buoyancy, magnetism, etc.) in combination with supporting undersurfaces, over surfaces and side surfaces upon which or about which they translate. In a first embodiment, floating platforms over which moving objects pass are implanted into a road surface. In a second embodiment, rollers rather than platforms are utilized. In a third embodiment, the moving vehicles, pedestrians and/or objects are provided with magnetic material generating electricity by passing over, under or by magnetized kinetic capturing panels containing coiled metallic wire ("kinetic panels").

18 Claims, 10 Drawing Sheets

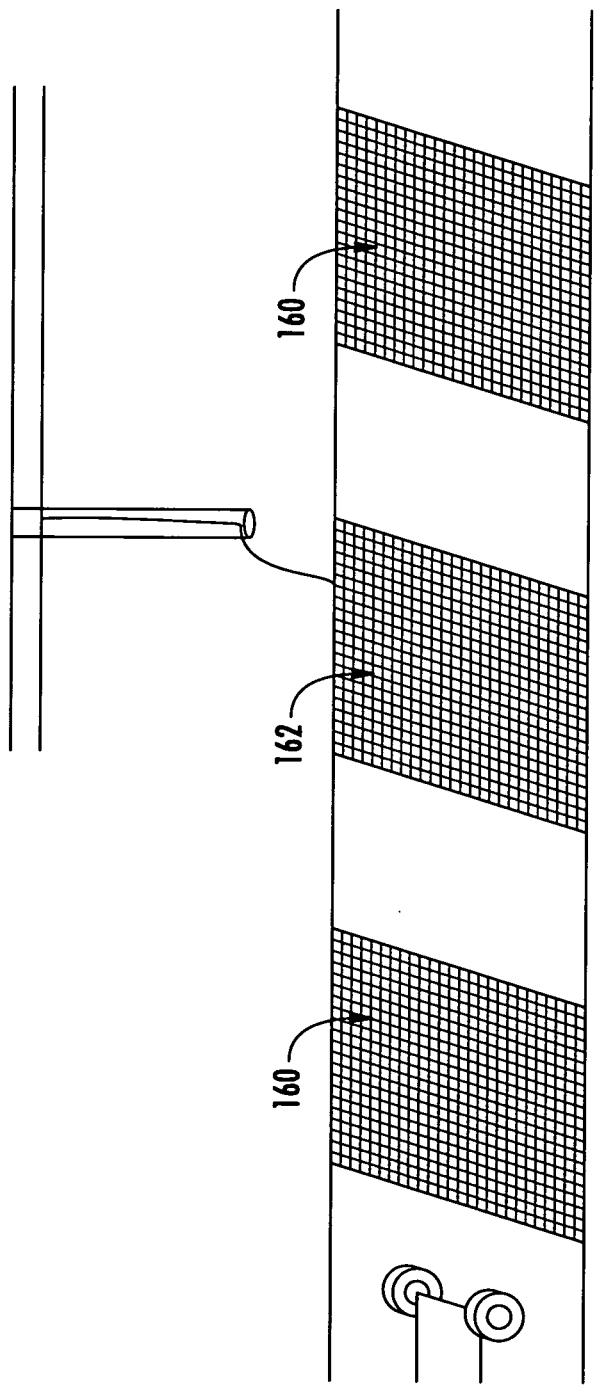

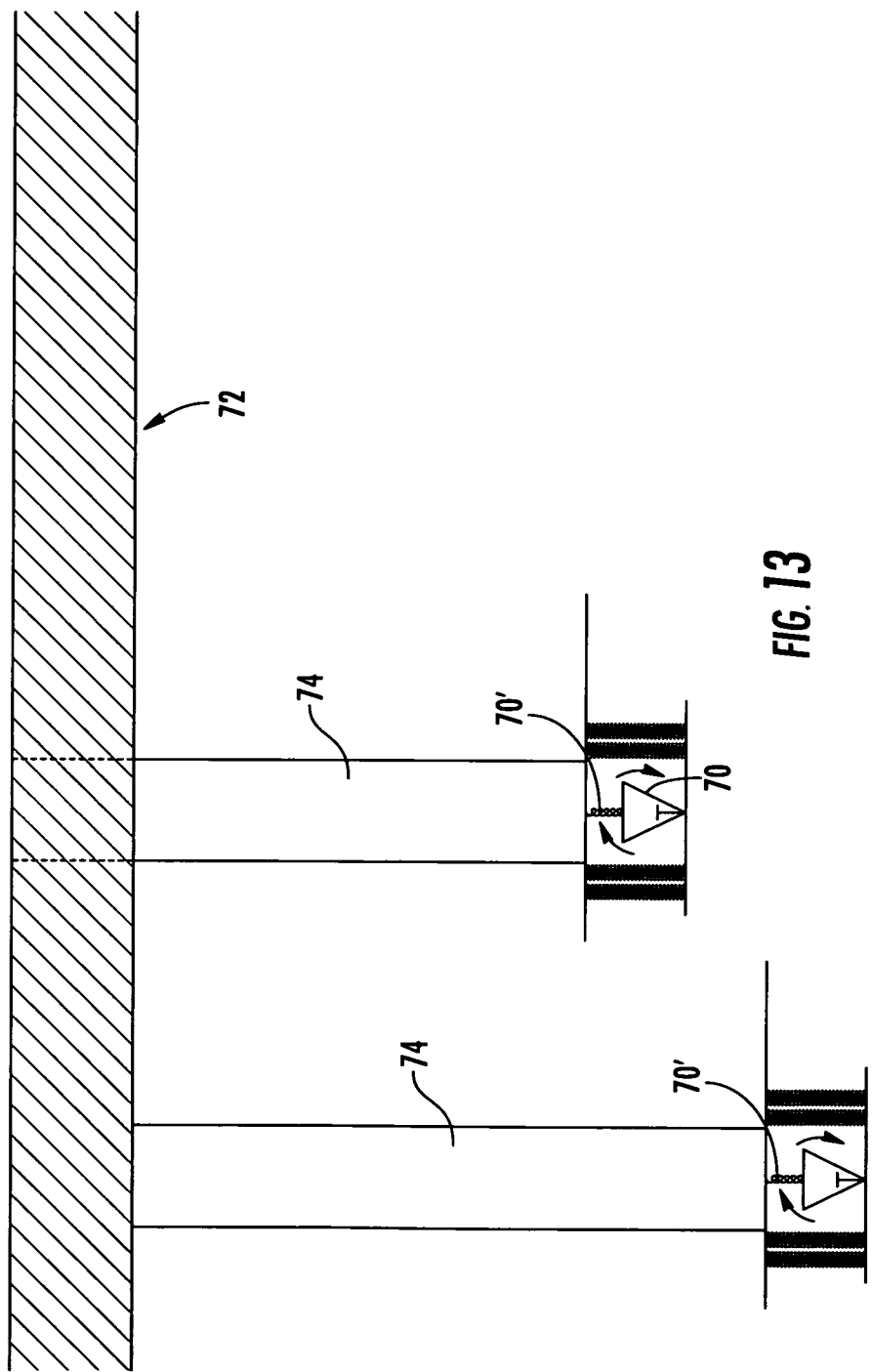

CONVERSION OF KINETIC INTO ELECTRIC ENERGY UTILIZING THE UNIVERSAL PRINCIPLES OF GRAVITY AND MAGNETISM

CROSS REFERENCE TO RELATED APPLICATION

Priority of provisional application No. 60/153,024, filed on Feb. 17, 2009 is claimed

BACKGROUND OF THE INVENTION

The present invention is directed to a method of generating electricity from the rolling contact between the wheels or tires of self-propelled vehicles and the support surface upon which the self-propelled vehicles translate.

It is well-known that the present high-cost of fossil fuels used in the generation of electricity for both commercial and home use has necessitated the search for new and alternative sources of augmenting electricity-generation. These so-called "clean" or "green" sources, such as wind power, solar power, fuel cells, thermal electric generation (i.e., harnessing the heat of volcanoes and the earth's magma along shallow fault lines), hydroelectricity, harnessing landfill, human waste and other gases, and the like, have been developed to a degree where they are now in common usage across the globe. The present invention is also directed to such a clean source for generating electricity, which may be used to substitute or supplement and augment existing and conventional generating sources, whether of the clean or carbon-based varieties.

It is well-known that electricity is generated or formed when there exists relative motion between a magnetic field and metallic conductors, such as copper wires. The changing magnetic field, or magnetic flux, through an element having an area perpendicular to the direction of magnetic field is given by the product of the magnetic field and the area of the element. The magnetic flux is defined by a scalar product of the magnetic field and the area-element vector. The magnetic flux through a surface is proportional to the number of magnetic field lines that pass through the surface. Quantitatively, the magnetic flux through a surface is defined as the integral of the magnetic field over the area of the surface. The magnetic flux through an open surface is an important quantity in electromagnetism. A change in the magnetic flux passing through a loop of conductive wire will cause an EMF or electromotive force, and therefore an electric current, in the loop. The relationship is given by the well-known equation called Faraday's law. The present invention utilizes this phenomenon to generate electricity.

Prior-art methods of utilizing the kinetic energy of moving vehicles are known. Examples of such prior art are shown in the following U.S. Pat. Nos. 7,239,031; 7,489,045; 7,530,761; 7,541,684; and 7,589,428. All of these prior-art systems require, and are based on, complicated and expensive technology. The invention involves cheaper technology, is more efficient, and is more readily implemented into existing infrastructure.

SUMMARY OF THE INVENTION

It is the primary objective of the present invention to generate electricity from a clean, or "green", source in a reliable, inexpensive and uncomplicated manner.

It is also the primary objective of the present invention to generate this electricity from a clean source utilizing the inertia of the translation, rolling, or other modes of movement, of self-propelled vehicles over a surface, such as vehicles travelling on a roadway or highway surface, subway trains travelling through a subway tunnel, an elevated train or trolley travelling on elevated tracks, an airplane landing on a runway, or any self-propelled vehicle, including but not limited to those propelled with the aid of gravity, that produces rolling friction between its wheels or tires and the undersurface upon which the wheels, trucks, or tires rollingly and frictionally engage. In another embodiment, electricity is produced via magnetic strips attached to the underside, roof or side, or other location of the moving vehicle, whereupon the vehicle passing over wire-mesh grids embedded in the road surface or track therebelow electricity is induced in the wire-mesh grid.

Toward these and other ends, the method of producing electricity according to the present invention comprises, in a first embodiment, implanting into a road surface, such as a paved highway road, in intermittent, downhill sections thereof, floating platforms over which the tires of the moving vehicles pass. Each floating platform is preferably mounted at a slight elevation above the rest of the road surface, whereupon gradual inclines and declines connect the ends of the platform to the adjoining road surfaces.

Mounted below each floating platform are a series of rotatable cones or spinning frustoconical elements each of which mount therein a plurality of electrically-conducting wires, or equivalents. Surrounding the inner surface of each rotatable cone is a magnetic-field producing element, such as a bipolar magnet. Alternatively, the plurality of rotating cones may be surrounded by just one, large magnetic-field producing element. Or, each platform itself may be magnetized with magnetic strips embedded into the material constituting the platform. Each rotating cone is connected to a portion of the platform via a spiral or threaded metal rod or shaft.

The lower section of the rod or shaft is threadingly-received into an upper threaded passageway formed in the upper section of each respective cone. As the vehicles pass over the platform, the platform is moved vertically downward a small amount, thus causing the spiral or threaded metal rods or shafts to also move vertically downward, whereupon each rod descends into the upper threaded passageway formed in the respective cone, to thereby cause the respective cone to rotate, much like a child's toy top, thus creating a magnetic flux that produces electricity in the copper wires mounted within each cone. The platform is spring loaded to return to its pre-depression condition. The copper wires of all of the cones are connected to a main output of the system of the invention, which in turn is connected to the pre-existing infrastructure: power transmission grid of an electric utility, where this generated electricity sent to the transmission grid is used as part of a net metering program that gives these systems a credit for the electricity they deliver to the grid. This credit offsets electricity provided from the grid when the system cannot meet demand, effectively using the grid as a storage mechanism. Alternatively, the electricity generated may be stored as in any conventional off-grid photovoltaic (PV) systems where the electricity is stored in rechargeable batteries.

In a second embodiment, instead of floating platforms, mounted below downhill-sections of a roadway, highway, and the like, thereby utilizing pre-existing gravitational force to offset any slowing of the moving vehicle while traversing over the roller, are a series of rollers that contact the wheels, trucks or tires of the moving vehicles. Therefore, as the moving vehicles travel over the plurality of spherical rollers or one long cylindrical roller, the rollers rotate. Each roller is made of suitable material and layered or otherwise embedded with magnetic strips or material. Mounted interiorly in each roller are a series of copper wires. Therefore, as the rollers are rotated by the tires of the translating vehicles, electricity is generated as the rotating magnetic field induces electricity in the conductive copper wires. The circumferential surface of each roller is coated with appropriate friction material to establish sufficient rolling-frictional contact between the tires and the rollers. The rollers are preferably located in downhill sections of the roadway or highway in order to minimize any reduction of speed to the moving vehicles, to thus ensure that little or virtually no energy loss is associated with the moving vehicles. As in the first embodiment, the electricity generated may be delivered directly to a power transmission grid or stored in rechargeable batteries.

In a third embodiment, platform and panel membranes are provided on the support surface, where each membrane consists of an interior copper-wire grid, or the equivalent thereof.

The passing vehicles are provided with magnets or magnetic-material within their wheels, tires, trucks, underbellies, side surfaces and roofs which, as the vehicle passes over the membrane or grid, electric current is induced in the copper wires. This embodiment will have especial application to automobiles, cars, trucks, buses, subway trains, locomotive trains and airplanes.

BRIEF DESCRIPTION OF THE DRAWINGS

The invention will be more readily understood with reference to the accompanying drawings, wherein:

FIG. 12 is a depiction of the embodiment of FIG. 10 where the magnetized webs or platforms are mounted in a subway tunnel; and FIG. 13 is a modification of the first embodiment applied to an elevated train system.

DETAILED DESCRIPTION OF THE INVENTION

Figure 1:
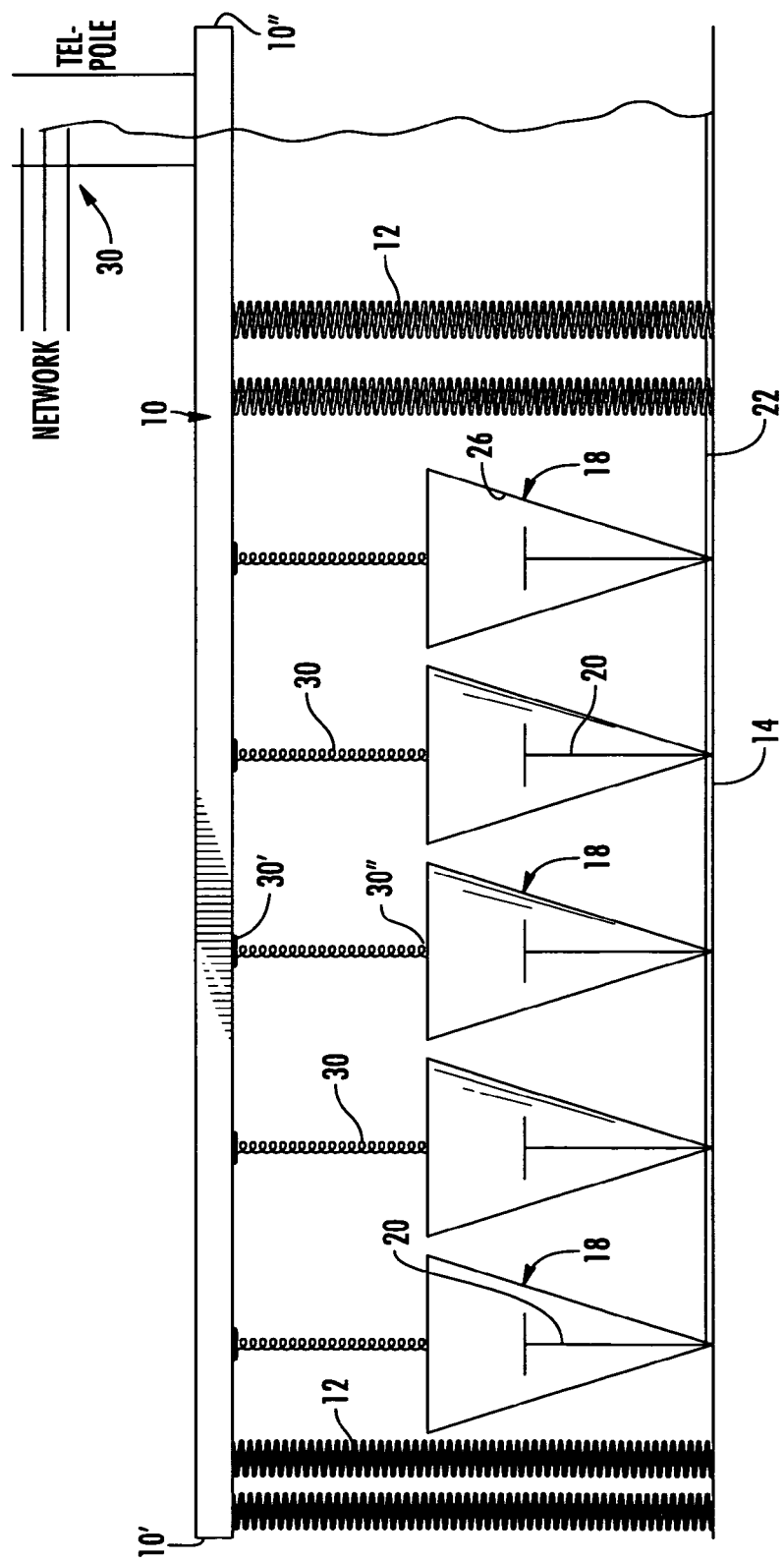
FIG. 1 is a plan view according to the first embodiment of the invention showing the generation of electricity by the passing of vehicles over a suspended platform forming part of a roadway, which roadway consists of a series of rotatably-mounted cones such that, when rotated by the depression of the platform owing to the weight of the passing vehicles, a magnetic flux is created.
Figure 2:
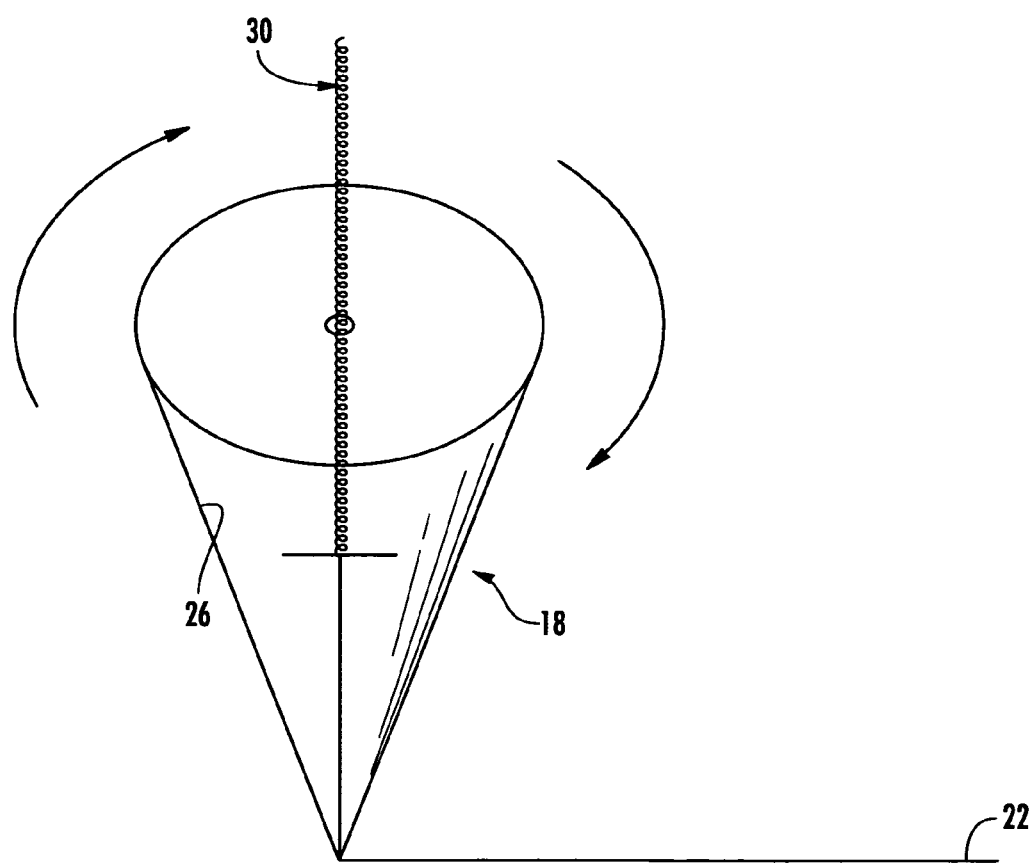
FIG. 2 is an isometric view of a rotatably-mounted cone of FIG. 1.
Figure 3:
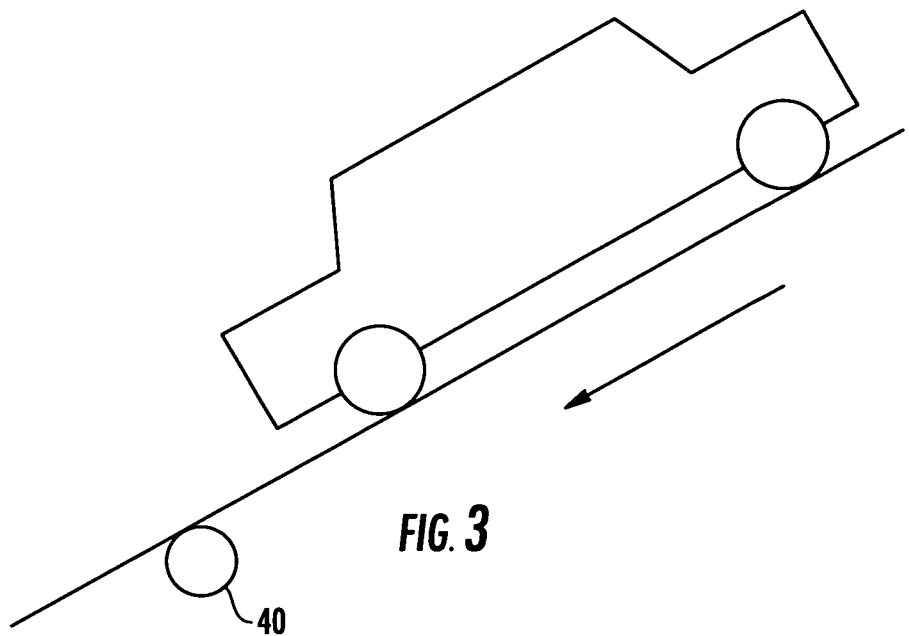
FIG. 3 is a plan view of a second embodiment of the invention where the tires of moving vehicles cause rotation of rollers embedded in the downhill sections of a roadway, to thereby cause a magnetic flux to generate electricity.
Figure 4:
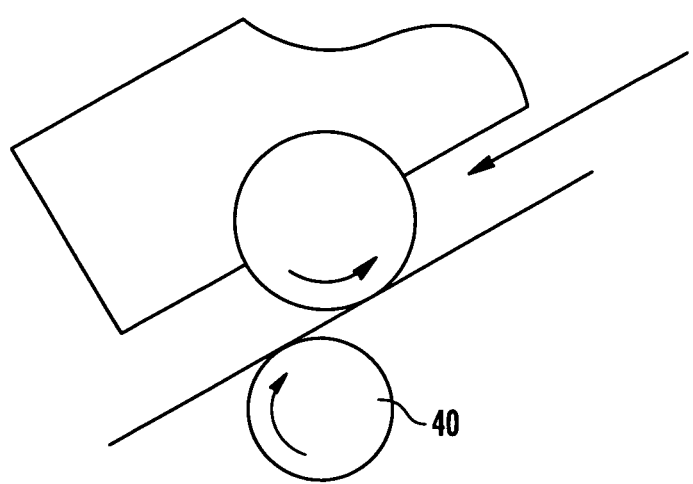
FIG. 4 is a detailed side elevation view showing the approaching rolling contact between a tire of a passing vehicle and a roller embedded in the roadway.
Figure 5:
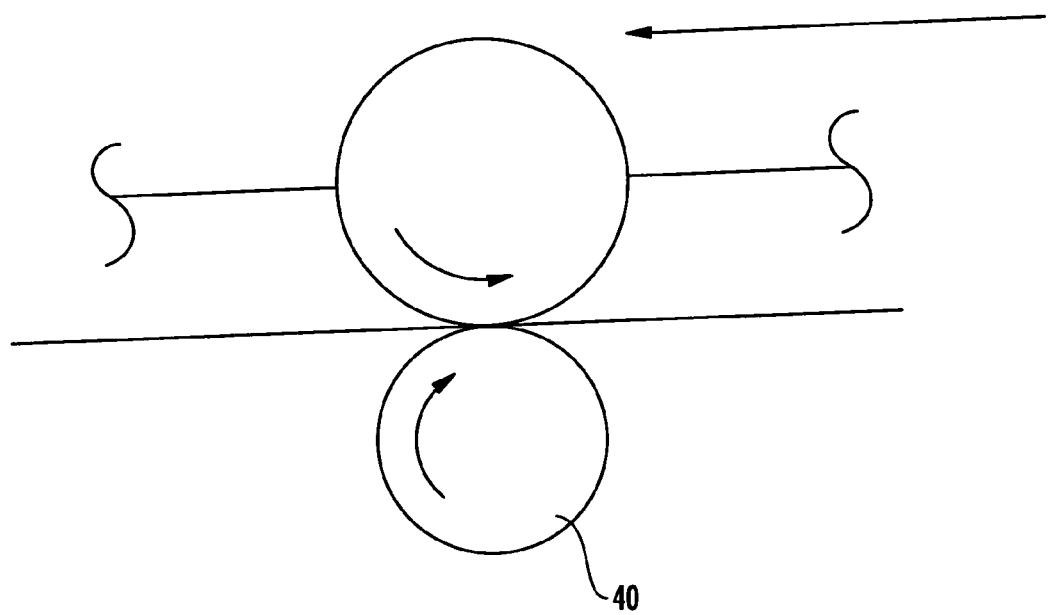
FIG. 5 is detailed side elevation view showing the rolling contact between a tire of a passing vehicle and a roller embedded in the roadway.
Figure 6:
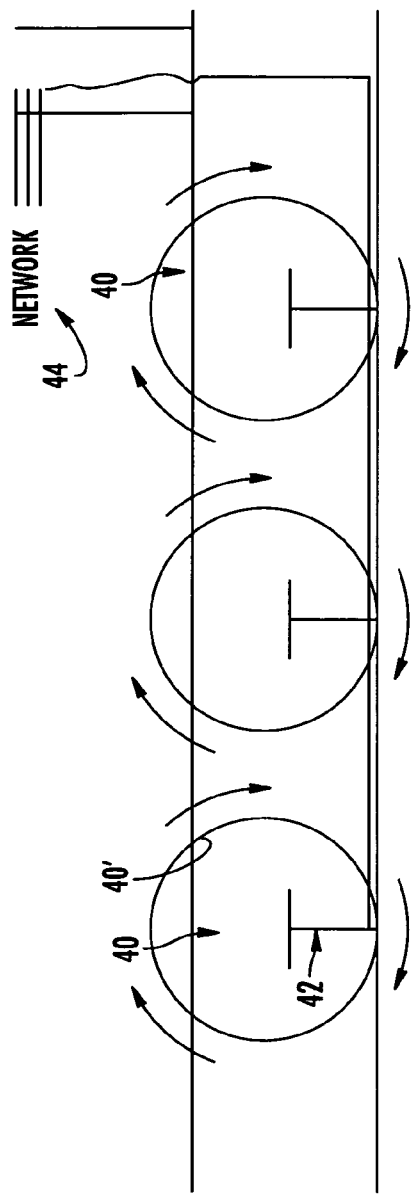
FIG. 6 is a side elevational view showing the series of rollers that contact tires of passing vehicles where each roller consists of an outer magnetized layer and provided with interiorly-mounted copper wires for generating electricity.

Referring now to the drawings in greater detail, and to FIGS. 1 and 2 for now, there is shown the first embodiment for generating electricity using the momentum of traveling, self-propelled vehicles over a road surface. The road surface in which the embodiment is employed is any highway or roadway containing one or more lanes. Floating or spring-biased platforms 10 are constructed into the upper surface of the road, or highway, at downhill sections thereof in order to use gravity to offset the rolling friction between the tires of the vehicles and the platform, where each platform has a width approximately equal to the width of a lane across which it stretches. Each platform 10 may be flush with the remainder of the road surface at each end 10', 10", or may be slightly raised thereabove, in which case each end 10', 10" would be connected to a sloping transitional section that gradually transitions the passing vehicles for passing over the platform. Each platform 10 is spring-biased upwardly by a series of vertically-mounted compression springs 12, each having an upper end fixedly connected to the undersurface of a platform 10 and a lower end affixed to the ground or other structure 14. Also mounted below each platform ground or other structure 14. Also mounted below each platform 10 are a series of a rotatably-mounted, cone-shaped, electricity-generating components or elements 18. Each cone rotatably-mounted, cone-shaped, electricity-generating components or elements 18. Each cone 18 is conventionally and rotatably mounted beneath the platform 10 by conventional bearing mounts, and has a hollow interior in which is mounted at least one stationary, non-rotatable, copper or metal wire, or plate or copper web 20, that is preferably t-shaped. Each wire or plate hollow interior in which is mounted at least one stationary, non-rotatable, copper or metal wire, or plate or copper web 20, that is preferably t-shaped. Each wire or plate 20 is stationary, non-rotationally, fixedly mounted in any conventional and well-known manner, and are interconnected in series via a conductor 22, which is output to a conventional grid system of a utility's transmission system.

Alternatively, the output of the conductor 22 may be connected to a battery-storage system such as any conventional off-grid photovoltaic (PV) systems where the electricity is stored in rechargeable batteries (not shown).

Each element 18 also is lined or formed with magnets or a magnetic liner 26 in the interior annular or circumferential surface, in a manner that is well-known, to thus surround respective copper wires or plates 18. In order to cause rotation of the cones or elements 18, associated with each cone or element cones or elements 18, associated with each cone or element 18 is a spiral metal rod 30 having an upper end 30' affixed to the undersurface of the platform 10 and a lower end 30" received in a spiral passageway formed in the upper surface or portion of the respective cone or element 18. As vehicles pass over the platform 10, thereby depressing or lowering the platform relative to the cones 18, the rods 30 are also moved downwardly therewith, to thus translate the lower end 30″ of a rod in an upper passageway of a respective cone or element 18, to thereby cause rotation of the cone thereby, in the manner that a spinning top is caused rotation. It is noted that the spiral rod and its associated spiral passageway have a thread pitch of sufficient degree to ensure that relative movement between the rod and the cones occurs when the platform 10 moves. That is, the pitch of the threads, as defined by the distance from the crest of one thread to the next, is chosen, in the conventional manner, such as to allow reduced friction in order to allow the linear motion to be converted to rotary.

As the platform is depressed or lowered as moving vehicles pass thereover, the downward movement of the rods 30 causes the cones 18 to rotate in a first direction, which, in turn, induces electricity in the stationary copper wires or plates 20 owing to the moving magnetic field via the rotating magnetic lining or magnets 26, which electricity is then transmitted to the power grid 30 or the battery-storage system. When there are no vehicles passing over the platform 10, the platform 10 will be moved or raised upwardly via springs 12. This, in turn, will cause the rods 30 to also be raised or moved upwardly, thereby causing rotation of the cones or elements 18 in a second, opposite direction. This opposite rotation of the cones 18 will also induce electricity in the copper wires 20, but of opposite polarity. Therefore, there is also preferably provided in the system a conventional full-wave rectifier (not shown) that converts the whole of the input waveform to one of constant polarity at its output. This full-wave rectification converts both polarities of the input waveform to DC that may be stored in the conventional battery-storage system.

Referring to FIG. 12, there is depicted using the rotating cones 70 of the first embodiment as part of an elevated train system 72. In this version, the vertical movements and strong vibrations caused in the elevated structure is transmitted to ground via the support columns 74, to thereby vertically move the rods 70' associated with the rotatable cones to thereby cause the rotation of the cones, in the manner described hereinabove with reference to the embodiment of FIGS. 1 and 2.

Figure 7:
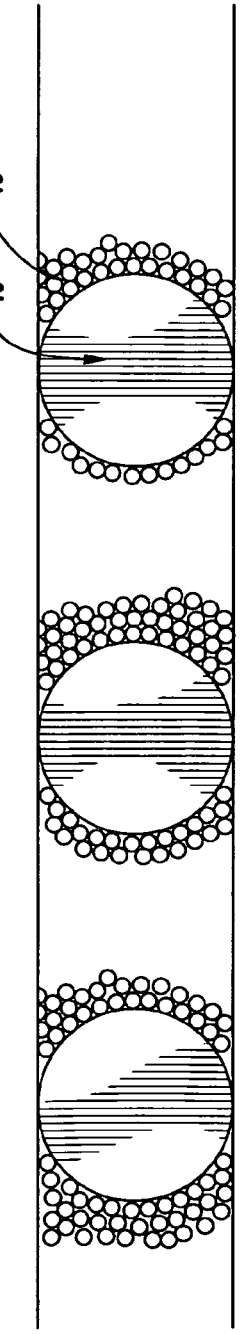
FIG. 7 is a side elevational view similar to FIG. 6 but showing a modification thereof where the series of rollers that contact tires of passing vehicles of the embodiment of FIG. 3 are contained in a lubricant for reducing wear and tear.
Figure 8:
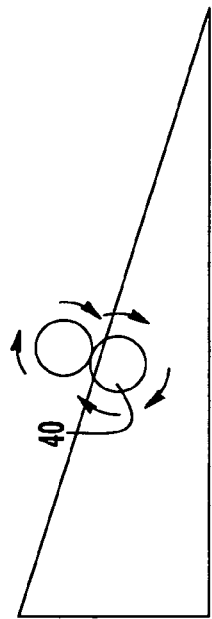
FIG. 8 is a side view of FIG. 3 depicting how the force of gravity is used during the downhill traverse of a passing vehicle in order to ensure that as little inertia is lost to the moving vehicle.

Referring to FIGS. 3-8, there is shown a second embodiment of the invention. In this embodiment, instead of generating electricity using rotatable cones, a series of parallelly-arranged spherical rollers or spinning spheres 40 are utilized. The rollers 40 are rotatably mounted below the road surface such that the vehicles pass over the rollers 40, whereby circumferential, rolling-friction contact between the tires of the vehicles and the rollers 40 cause the rollers to rotate. As may be seen in FIG. 6, each roller or sphere 40 contains at least a partial hollow interior and interiorly-embedded, electrically-conducting, copper wire or wires or plates 42, each being stationary and non-rotatably mounted in a respective roller or sphere, in a conventional and well-known manner; for example, the wires or plates may be mounted to the stationary mounting shafts (not shown for purposes of clarity) of each roller or sphere 40, which shafts mount the rollers for rotation thereabout. As in the first embodiment, the interior circumferential surface 40' of each roller is provided with magnets or magnetic material, or is made of composite material including magnetic properties, so that, as the rollers 40 rotate via contact with the tires of the passing vehicles, a magnetic flux is created to thus induce electric current in the stationary copper wires 42. The current thus produced is then transmitted to the power grid 44 or the battery-storage system, as explained above with reference to the first embodiment. The rollers 42 are preferably located in downhill sections of the highway or roadway, as depicted in FIG. 8, in order to use the force of gravity to offset the rolling friction between the tires of the vehicles and the rollers 40. In addition, each roller rollers 40. In addition, each roller 40 is also preferably encased in a ball-bearing mount 46 submerged in liquid to reduce friction, drag and wear, as seen in FIG. 7.

Figure 9:
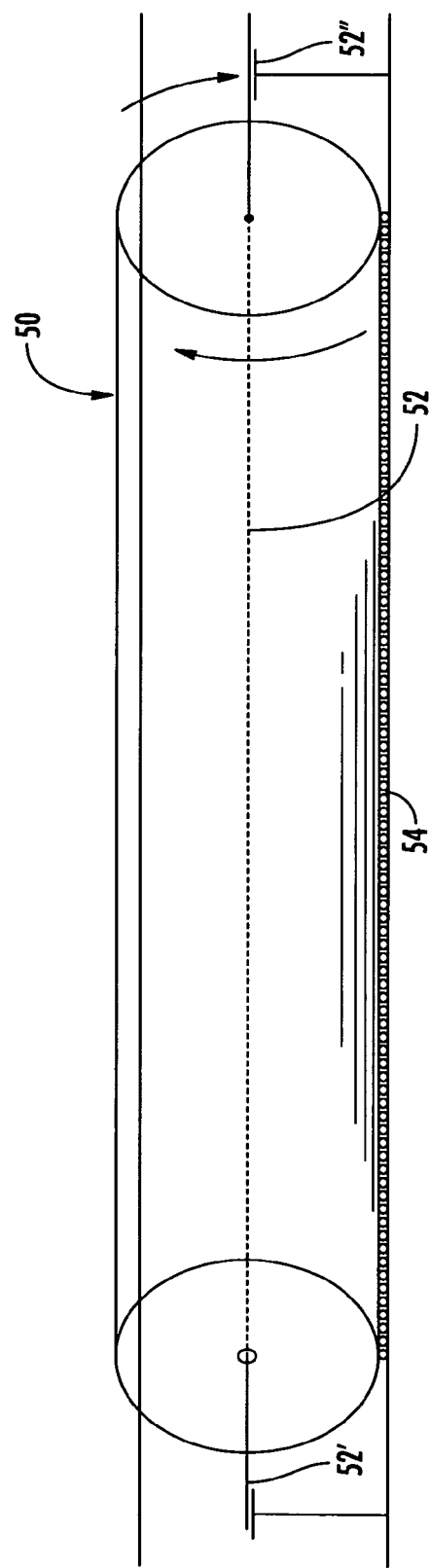
FIG. 9 is a side view showing another modification of the embodiment of FIG. 3, where, instead of providing a series of individual rollers that contact the tires of passing vehicles, a series of rotatable cylinders are provided with each cylinder being the width of a lane of the road in which they are embedded.

In a modification of the second embodiment of FIGS. 3-8, instead of the use of the rollers 40, spinning or rotating cylinders rollers 40, spinning or rotating cylinders 50 may be used, as shown in FIG. 9, with each cylinder having a length that substantially extends across the width of a lane of the roadway. Each cylinder 50 has an interiorly-embedded, electrically conducting copper wire or wires 52 which extend longitudinally axially in the interior thereof, through the stationary mounting shaft (not shown), with the ends 52', 52″ thereof being output to a collective line coupling all of the interiorly-embedded, electrically conducting metal wires 52 together, for transmitting the electricity generated to a power grid or the battery-storage system, as explained above. As in the case of the rollers 40, each cylinder rollers 40, each cylinder 50 is provided with interiorly-embedded, circumferential or annular magnets or magnetic material, or is made of composite material including magnetic properties so that, as the cylinders 50 rotate via contact with the tires of the passing vehicles, a magnetic flux is created to thus induce electric current in the copper wires 52. As in the previously-described embodiments, the cylinders are also preferably encased in ball-bearing mounts 54, are contained in a fluid environment to reduce friction, and each is provided with an outer circumferential layer of friction material for contact with the passing tires.

Figure 10:
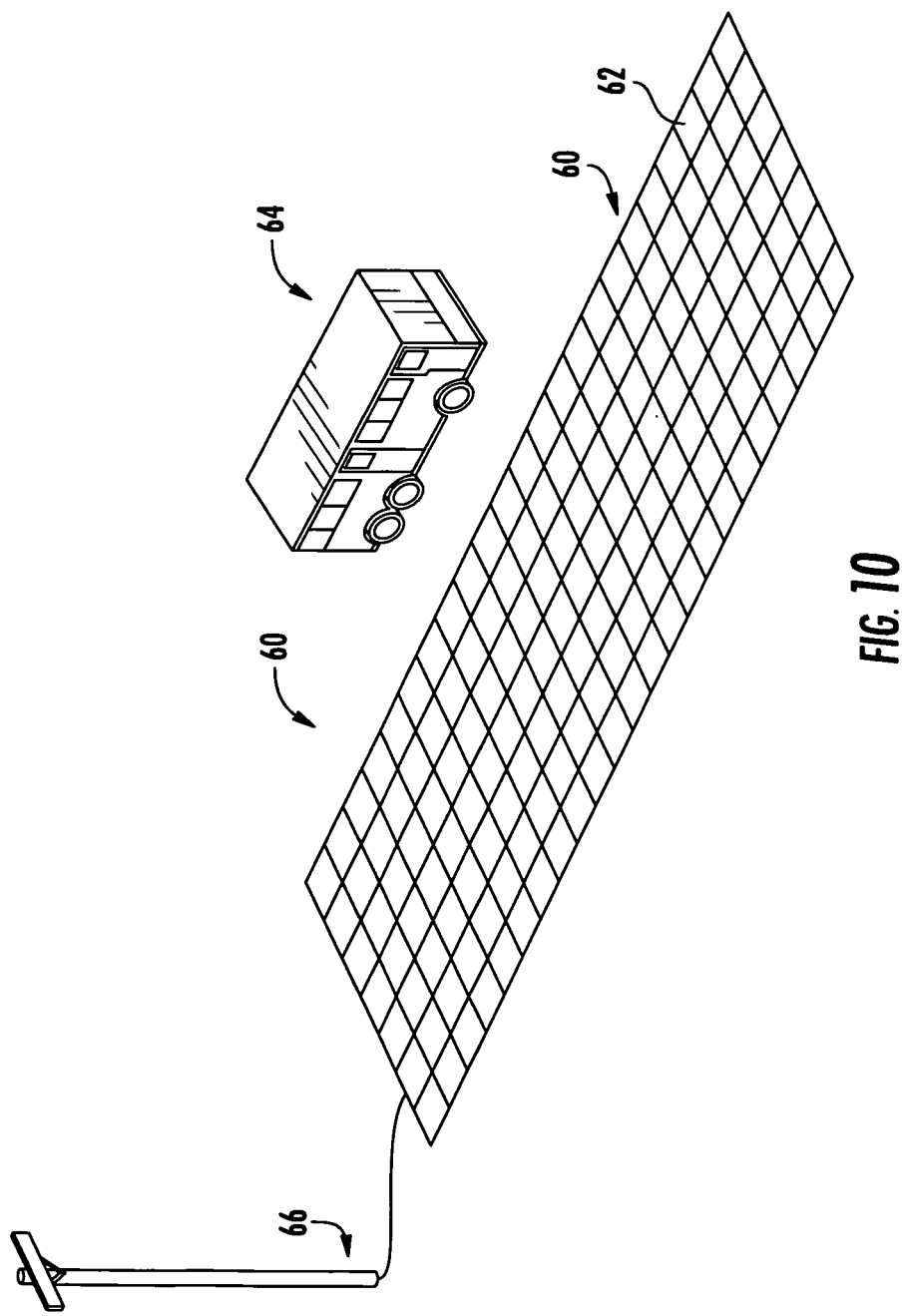
FIG. 10 is a diagram of a third embodiment of the invention where the surface of a roadway is provided with a magnetized platform or membrane having a copper-wire grid, with the undersurface.

Referring now to FIG. 10, there is shown another embodiment of the invention. In this version, instead of the use of rotating cones, spherical rollers or cylinders, which require rolling-friction contact in conjunction with gravitational force, a platform, wire web or panel 60 is used, which is laid or stretched out over sections of a roadway, railroad bed, or subway-tunnel floor, subway-side walls, subway tunnel ceilings and airport runways, and the like. Each platform, grid or web 60 is made of a composite material having a grid of copper wires 62, which composite material is chosen from conventional materials so as to withstand heavy use. Each passing vehicle grid of copper wires 62, which composite material is chosen from conventional materials so as to withstand heavy use. Each passing vehicle 64, whether a car, truck, bus, train, trolley car, subway, airplane, boat or the like, is provided with magnets or magnetized material in the undersurface, side surface or roof thereof, or in the tires thereof, whereby, as each vehicle passes over the grid 60, electricity is induced, which is then transmitted to a power transmission network 66, as described above. The width of each web 60 is preferably the width of highway or roadway lane, or in the case of trains or subway train cars, the width is determined by the gauge of the tracks. Each panel 60 may also be magnetized.

It is noted that in this embodiment, also, a conventional full-wave rectifier is also required, since, as the moving vehicle approaches the copper wires of the grids, the magnetic surface thereof will induce an EMF of a first sense, but as that magnetic surface moves away, it will induce an EMF of an opposite sense.

Figure 11:
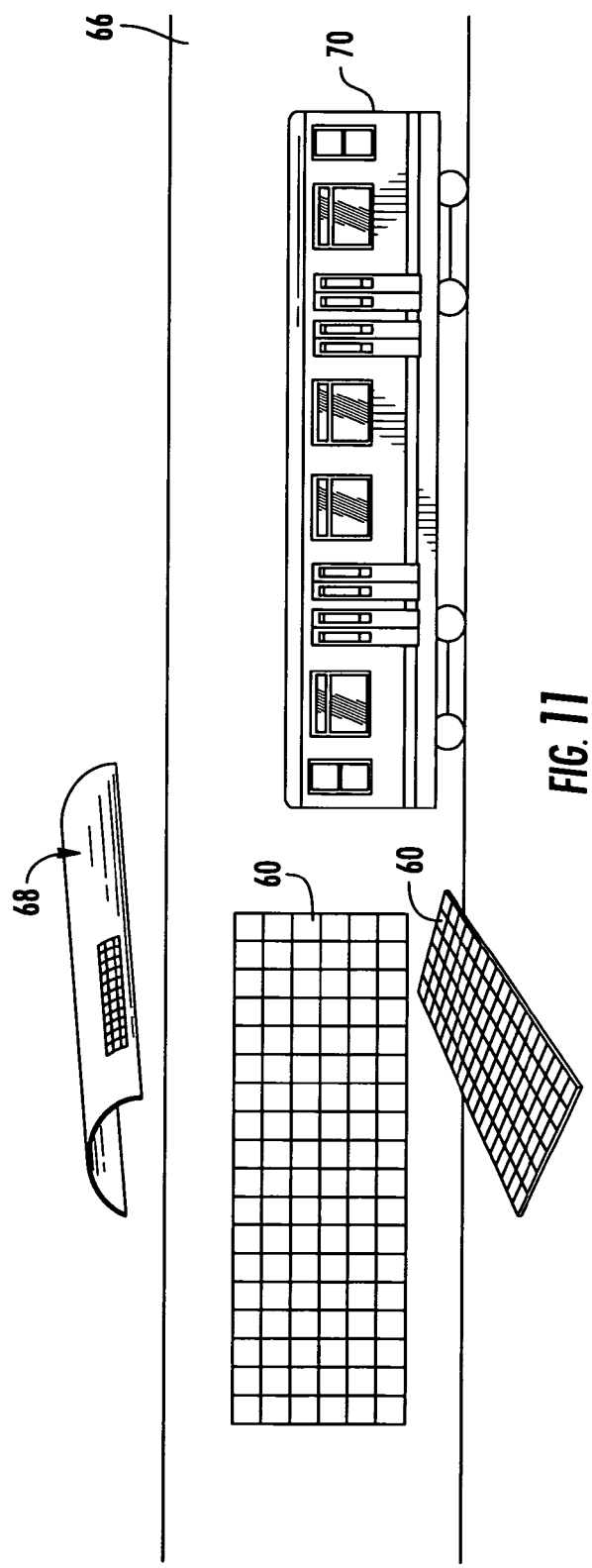
FIG. 11 is a diagram of a modification of the embodiment of FIG. 10, where alternating panels of oppositely-polarized magnetized platforms or membranes are applied to a roadway or track.

Referring to FIG. 11, there is depicted a modification where the magnetized panels of the embodiment of FIG. 10 are used in a subway tunnel. In this case, the walls 66 and ceiling 68 of the tunnel, as well as the panels 60, are all embedded with copper wires, so that as the subway train cars 70 with magnetized undersurface, side surface and roof move in the tunnel, electric current will be induced in the copper-wire grid. The panels 60 may also be magnetized as described hereinbelow with regard to the modification of FIG. 12.

Referring to FIG. 12, there is shown another modification of the embodiment of FIG. 10.

In this modification, there are a provided a first, alternating series of panels 160 with embedded copper or metallic wires, each being itself magnetized of a first polarity, and a second, alternating series of panels 162 interspersed between the panels 160, with the panels 162 also being magnetized but of opposite polarity as that of the panels 160, so that an alternating pattern of oppositely-polarized panels 160, alternating pattern of oppositely-polarized panels 160,162 are laid or imbedded in a highway, roadway, subway or train track, runway, boating vessel throughway, and the like. This arrangement will induce electricity in the copper wires 20, but of opposite polarity, as the vehicles pass over alternating panels 160, vehicles pass over alternating panels 160,162. Therefore, there is also preferably provided in the system a conventional full-wave rectifier, as in the embodiment of FIG. 1, that converts the whole of the input waveform to one of constant polarity at its output. This full-wave rectification converts both polarities of the input waveform to DC that may be stored in the conventional battery-storage system. In addition, with this arrangement, one set of panels 160 or 162 will slow the passing vehicles down while the other set of panels 160, other set of panels 160,162 will speed it up, thus helping to overcome the kinetic energy lost during passage of the vehicle over a panel of opposite magnetic polarity.

It is to be understood that any of the above-described species of the invention may also be used with other objects similar to vehicles, and the like, whether self-propelled or not, and where the moving object or item has its own kinetic energy. Examples other objects are, for example, skateboards, skates, roller skates, sleds, bicycles, three-wheelers, roller coasters, other amusement park rides, and the like.

While specific embodiments of the invention have been shown and described, it is to be understood that numerous changes and modifications thereof may be made without departing from the scope and spirit of the invention.

What is claimed is:

1. A method of generating electricity utilizing the weight and/or kinetic energy of translating vehicles on a supporting undersurface, comprising:
    (a) embedding along the supporting undersurface a series of electricity-generating elements that utilize the weight and/or kinetic energy of the translating vehicles;
    (b) said step (a) comprising choosing the electricity-generating series of elements from at least one of the following group of series consisting of: a first series of floatingly-mounted platforms having a series of a rotatably-mounted, substantially cone-shaped, electricity-generating components mounted below the floatingly-mounted platforms; or a second series of electricity-generating friction rollers rotatable by frictional contact with the tires or wheels of the translating vehicles;
    (c) generating electricity in said electricity-generating series of elements by passing the translating vehicles thereover; and
    (d) outputting the electricity generated to a one of: a storage battery system, an electrical network, or the electrical grid, to power nearby highway or roadway lighting, traffic lights, and nearby commercial and residential buildings; and
    (e) the method of generating electricity utilizing the weight and/or kinetic energy of translating vehicles on a supporting undersurface according to steps (a) thru (d), wherein said step (b) comprises mounting at least one electricity-conducting metallic wire and at least one electricity-generating metallic plate in the interior of each said cone-shaped component or friction roller, and providing each said cone-shaped component and friction roller with magnetic material, whereby as each said cone or roller rotates, electricity is generated in each said wire or plate.

2. The method of generating electricity utilizing the weight and/or kinetic energy of translating vehicles on a supporting undersurface according to claim 1, wherein said step (b) of providing each said cone-shaped component or roller with magnetic material comprises lining at least part of the interior surface of each said cone-shaped component and roller with the magnetic material.

3. The method of generating electricity utilizing the weight and/or kinetic energy of translating vehicles on a supporting undersurface according to claim 1, wherein said step (b) further comprises spring-loading each said platform for vertical motion toward and away from respective said cone-shaped components; and converting the vertical movement of each said floatingly-mounted platform to the rotational movement of said respective cone-shaped components.

4. The method of generating electricity utilizing the weight and/or kinetic energy of translating vehicles on a supporting undersurface according to claim 1, wherein said step (b) further comprises connecting each said cone-shaped component to the undersurface of a respective said floating platform by a threaded rod received in a longitudinal threaded passageway of a the respective said cone-shaped component;
    said step (c) comprising rotating each respective said cone-shaped component in a first direction when a respective said platform is moved in the downward direction by the weight of a translating vehicle passing thereover, and rotating each respective said cone-shaped component in a second, opposite direction when a respective said platform is returned to its upward position after the translating vehicle has passed thereover so as to produce electricity of opposite polarity.

5. The method of generating electricity utilizing the weight and/or kinetic energy of translating vehicles on a supporting undersurface according to claim 4, wherein said step (c) comprises generating electricity by said cone-shaped components in both said first and second directions of rotation of said cone-shaped components; said step (c) further comprising full-wave rectifying for converting the whole of the input waveform to one of constant polarity at its output in order to utilize the electricity generated during both said first and second directions of rotation of said cone-shaped components.

6. The method of generating electricity utilizing the weight and/or kinetic energy of translating vehicles, pedestrians and objects on a supporting undersurface, over surface or side surface according to claim 5, said step (c) further comprising full-wave rectifying the electricity generated for converting the whole of the input waveform to one of constant polarity at its output in order to utilize the electricity generated during movement of the vehicles toward and away from said series of kinetic panels and may supplement or substitute existing braking systems.

7. The method for generating electricity utilizing the weight and/or kinetic energy of translating vehicles on a supporting undersurface claim 1, wherein each of said first and second series of said series of electricity-generating elements comprising at least one of at least one electricity-conducting metallic wire and at least one electricity-generating metallic plate in the interior of each said cone-shaped component or friction roller; each of said cone-shaped components and said friction rollers comprising magnetic material, whereby as each said cone or roller rotates, electricity is generated in each said wire or plate.

8. The system for generating electricity utilizing the weight and/or kinetic energy of translating vehicles on a supporting undersurface claim 7, wherein each said cone-shaped component or friction roller comprises an interior surface, each interior surface comprising an interiorly-lined magnetic coating of said magnetic material.

9. The method for generating electricity utilizing the weight and/or kinetic energy of translating vehicles on a supporting undersurface claim 1, wherein each said floatingly-mounted platform of said first series of electricity-generating elements comprises a spring-loaded platform for vertical motion toward and away from respective said cone-shaped components, whereby vertical movement of each said floatingly-mounted platform is converted to the rotational movement of said respective cone-shaped components.

10. The system for generating electricity utilizing the weight and/or kinetic energy of translating vehicles on a supporting undersurface claim 9,
    (a) wherein each said floatingly-mounted platform of said first series of electricity-generating elements further comprises a plurality of threaded rods for reception longitudinal threaded passageways of said cone-shaped components,
    (b) one said threaded for a respective said threaded passageway of a respective said cone-shaped component, whereby rotation of each respective said cone-shaped component in effected in a first direction when the respective said platform is moved in the downward direction by the weight of a translating vehicle passing thereover,
    (c) and rotation of each respective said cone-shaped component is effected in a second, opposite direction when a respective said platform is returned to its upward position after the translating vehicle has passed thereover,
    (d) so as to produce electricity of opposite polarity.

11. The system for generating electricity utilizing the weight and/or kinetic energy of translating vehicles on a supporting undersurface claim 10, further comprising full-wave rectifying circuitry for converting the whole of the input waveform to one of constant polarity at its output in order to utilize the electricity generated during both said first and second directions of rotation of said cone-shaped components.

12. A system for generating electricity utilizing the kinetic energy of translating vehicles, pedestrians and objects on a supporting undersurface, over surface or side surface comprising:
    a series of electricity-generating elements on top of or embedded within an undersurface, over surface or side surface upon or by which the translating vehicles travel, said elements utilizing the kinetic energy of the translating vehicles;
    said series of kinetic panels containing metallic wire coils;
    wherein said series of kinetic panels contain an interior of magnets and embedded therein or thereupon said series of metallic wire coils;
    generating electricity in said electricity-generating series of elements by passing the translating vehicles, pedestrians or objects thereover, thereunder or thereby;
    output circuitry outputting the electricity generated to one of: a storage battery system, an electrical network, or the electrical grid, in order to power nearby highway and roadway lighting, traffic lights, and nearby commercial and residential buildings, or retaining or reintroducing the generated electricity to the kinetic panels for further electrical dissemination; and
    further comprising full-wave rectifying circuitry coupled to the output of said series of kinetic panels for converting the whole of the input waveform thereto to one of constant polarity at its output in order to utilize the electricity generated during movement of the vehicles, pedestrians or objects toward, over and away from said series of magnetized kinetic panels.

13. The system for generating electricity utilizing the kinetic energy of translating vehicles, pedestrians and objects on a supporting undersurface, over surface, or side surface claim 12, wherein said series of electricity-generating elements comprises a series of magnetized kinetic panels containing an interior of magnets or gyroscopic magnetic spheres containing concentrically moving shells and embedded therein or thereupon or thereabout a series of metallic wire coils, such as copper-wire, or wire composed of some other metal wherein in the presence of magnetic flux, in one of any number of symmetric geometric or quasi-symmetric geometric configurations.

14. The method or system for generating electricity utilizing the kinetic energy of translating vehicles, pedestrians and objects as found in the kinetic panel system in the alternative pursuant to claims 13 or 12, wherein, the output circuitry outputting the electricity generated to a one of a storage battery system and/or an electrical network and may also be used to power nearby highway and roadway lighting, traffic lights, and nearby commercial and residential buildings, including but not limited to, lighting, electronics and appliances on a country-wide, state-wide, local government-wide, homeowner's association-wide, community-wide, residential development-wide or individual level and/or may also be retained or reintroduced to the kinetic panels for electromagnetic purposes and/or retained or reintroduced to the highway, roadway, train track, subway track and the like so as to power electrically powered (partially or wholly) vehicles and/or those vehicles' electrical lighting and other devices.

15. The method or system for generating electricity utilizing the kinetic energy of translating vehicles, pedestrians and objects as found in the kinetic panel system in the alternative pursuant to claims 13 or 12 wherein,
    (a) the output circuitry outputting the electricity generated to a one of a storage battery system and/or an electrical network and may also be used to power,
    (b) nearby highway and roadway lighting, traffic lights, and nearby commercial and residential buildings, including but not limited to,
    (c) lighting, electronics and appliances on a country-wide, state-wide, local government-wide, homeowner's association-wide, community-wide, residential development-wide or individual level and/or,
    (d) may also be reintroduced to the kinetic panels for electromagnetic purposes and/or,
    (e) reintroduced to the highway, roadway, train track, subway track and the like so as to power electrically powered (partially or wholly) vehicles and/or those vehicles' electrical lighting and other devices.

16. The method or system for generating electricity utilizing the kinetic energy of translating objects on a supporting undersurface, over surface, or side surface, in the alternative pursuant to claims 13 or 12, wherein said step third series of electricity-generating elements comprises a series of magnetized kinetic panels containing coiled metallic wire, whereby upon translating objects provided with magnets secured to the undersurfaces, side surfaces, top surfaces, tires, trucks, etc. thereof pass over said series of kinetic panels to induce electricity.

17. The method or system for generating electricity utilizing the kinetic energy of translating vehicles, pedestrians and objects as found in the magnetized kinetic panel system, in the alternative pursuant to claims 13 or 12, wherein, the output circuitry outputting the electricity generated to a one of a storage battery system and/or an electrical network and may also be used to power nearby highway and roadway lighting, traffic lights, and nearby commercial and residential buildings, including but not limited to, lighting, electronics and appliances on a country-wide, state-wide, local government-wide, homeowner's association-wide, community-wide, residential development-wide or individual level and/or may also be reintroduced to the kinetic panels for electromagnetic purposes and/or reintroduced to the highway, roadway, train track, subway track and the like so as to power electrically powered (partially or wholly) vehicles and/or those vehicles' electrical lighting and other devices.

18. As a supplement to the kinetic panel system found in the alternative to claim 12, or standing alone, the kinetic panels may be comprised not only metallic wiring coils laid in a bed of magnets or gyroscopic magnetic spheres containing concentrically moving shells of opposite and/or same polarity to the magnetized vehicles, pedestrians or objects but also of quartz crystal the flexing of which under pressure naturally emits an electrical charge.

* * * * *